(12) United States Patent
Onoda

(10) Patent No.: US 7,995,292 B2
(45) Date of Patent: Aug. 9, 2011

(54) IMAGE PICKUP LENS AND IMAGE PICKUP APPARATUS

(75) Inventor: Yoshitomo Onoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/385,241

(22) Filed: Apr. 2, 2009

(65) Prior Publication Data

US 2009/0268312 A1    Oct. 29, 2009

(30) Foreign Application Priority Data

Apr. 23, 2008    (JP) ................. 2008-112607

(51) Int. Cl.
*G02B 9/34* (2006.01)
(52) U.S. Cl. ...................................... 359/773
(58) Field of Classification Search .............. 359/771, 359/773
See application file for complete search history.

(56) References Cited

U.S. PATENT DOCUMENTS

| 7,561,347 B2* | 7/2009 | Park et al. ............. 359/773 |
| 2008/0043343 A1 | 2/2008 | Chen et al. |

FOREIGN PATENT DOCUMENTS

| EP | 1 804 101 A1 | 7/2007 |
| EP | 1 898 244 A1 | 3/2008 |
| EP | 1 909 130 A1 | 4/2008 |
| JP | 2005-292559 | 10/2005 |
| JP | 2007-155868 | 6/2007 |
| JP | 2007-219079 A | 8/2007 |
| JP | 2007-286153 A | 11/2007 |
| JP | 2009-069195 A | 4/2009 |

OTHER PUBLICATIONS

Extended European Search Report issued for corresponding European Application No. 09 25 0860.

* cited by examiner

*Primary Examiner* — Alicia M Harrington
(74) *Attorney, Agent, or Firm* — Rader, Fishman & Grauer PLLC

(57) ABSTRACT

An image pickup lens includes, in order from an object side, a first lens element having a positive refractive power and a convex surface facing the object side, an aperture stop adjusting the amount of light, a second lens element having a negative refractive power, a third lens element having a positive refractive power and a concave surface facing the object side, and a fourth lens element having a negative refractive power. In the image pickup lens, the following conditional expressions are satisfied, $$0.6 < |f2/f| < 1.8$$

$$0 \leq f2/R4 < 1.7$$

where f denotes a focal length of an entire lens system, f2 denotes a focal length of the second lens element, and R4 denotes a curvature radius of an object-side surface of the second lens element.

6 Claims, 9 Drawing Sheets

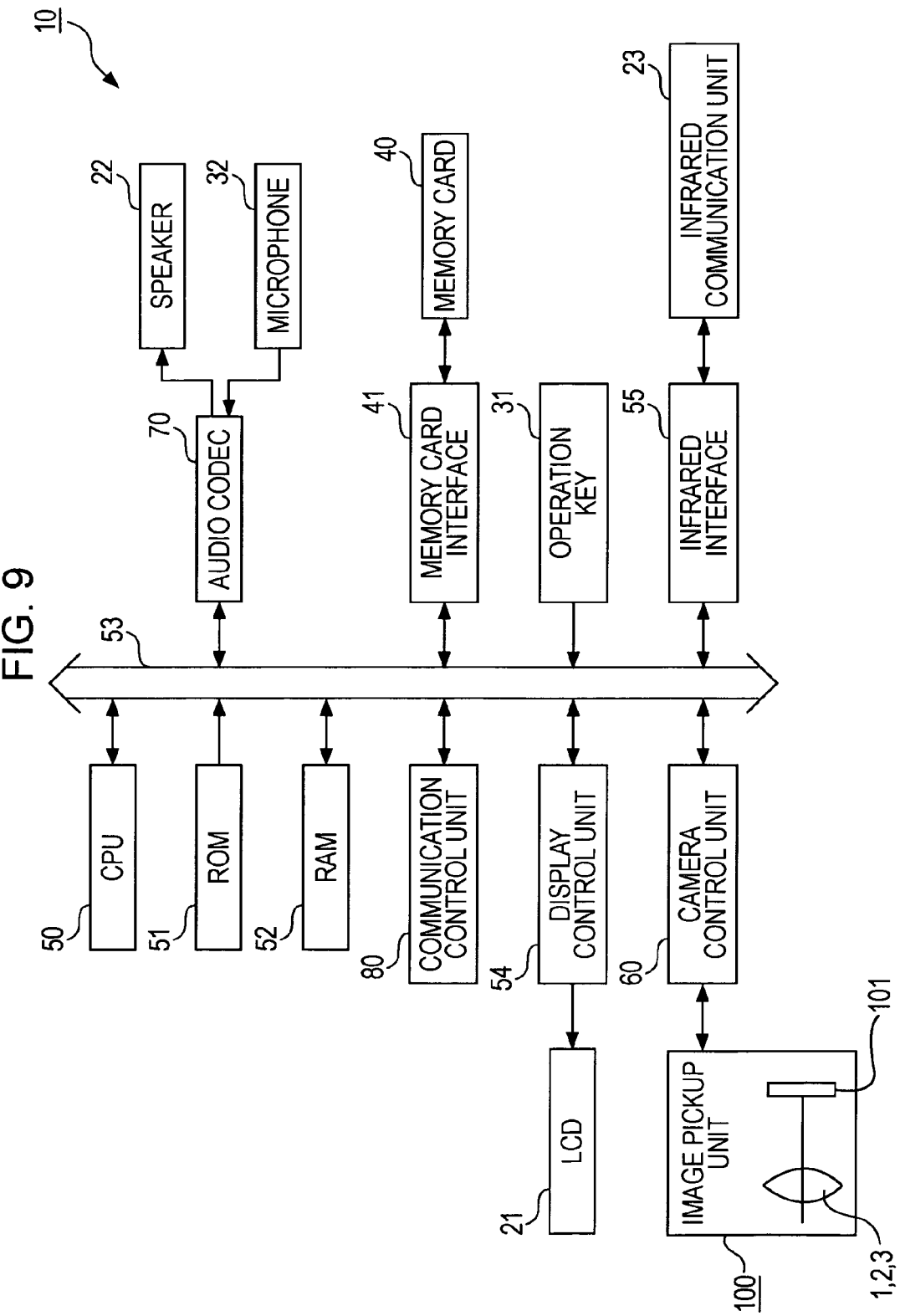

IMAGE PICKUP LENS AND IMAGE PICKUP APPARATUS

BACKGROUND OF THE INVENTION

1. Field of the Invention

The present invention relates to image pickup lenses and image pickup apparatuses, and more specifically to a technical field of an image pickup lens having a small size and improved optical performance, and an image pickup apparatus including the image pickup lens.

2. Description of the Related Art

Many of common image pickup apparatuses, such as camera-equipped mobile phones and digital still cameras, include charge-coupled devices (CCDs) and complementary metal-oxide semiconductors (CMOSs), for example, functioning as solid-state image pickup devices.

In recent years, there has been an increasing demand for size reduction in such image pickup apparatuses. Accordingly, image pickup lenses to be included in these apparatuses are desired to have short total optical lengths. In response to this trend, Japanese Unexamined Patent Application Publication No. 2007-155868 discloses an exemplary image pickup apparatus including a small-sized image pickup lens.

Together with the size reduction in recent small-sized image pickup apparatuses such as camera-equipped mobile phones, the number of pixels of image pickup devices included in the image pickup apparatuses has also been increasing. Apparatuses including image pickup devices of a so-called mega-pixel type having resolutions of at least one million pixels are becoming the mainstream.

Therefore, image pickup lenses to be included in such apparatuses are desired to have high lens performance so as to adapt themselves to the aforementioned image pickup devices having large numbers of pixels. Japanese Unexamined Patent Application Publication No. 2005-292559 discloses another exemplary image pickup apparatus including an image pickup lens having high lens performance.

SUMMARY OF THE INVENTION

The image pickup lens disclosed in Japanese Unexamined Patent Application Publication No. 2007-155868 includes a reduced number, namely three, of lens elements, and therefore has a reduced size with a reduced total optical length. However, the image pickup lens including such a reduced number of lens elements is difficult to be used with a recent image pickup device including a large number of pixels. In other words, since the image pickup lens includes only a small number of lens elements, it is difficult to realize desirable correction of aberrations occurring with the increasing number of pixels included in the image pickup device. In particular, it is difficult to accommodate high resolutions and to correct chromatic aberration.

On the other hand, the image pickup lens disclosed in Japanese Unexamined Patent Application Publication No. 2005-292559 includes four lens elements and has high aberration correctability. Instead, the image pickup lens has a long total optical length, preventing size reduction. In addition, the image pickup lens has an aperture stop at the front end of its optical system, i.e., on the object side with respect to a first lens element. This increases manufacturing sensitivity, resulting in large changes in aberrations due to, for example, axial misalignment between lens elements, and therefore may cause a reduction in optical performance.

In view of the above, it is desirable that the present invention provides an image pickup lens and an image pickup apparatus maintaining the sizes thereof to be small and having improved optical performance.

According to an embodiment of the present invention, an image pickup lens includes, in order from an object side, a first lens element having a positive refractive power and a convex surface facing the object side, an aperture stop adjusting the amount of light, a second lens element having a negative refractive power, a third lens element having a positive refractive power and a concave surface facing the object side, and a fourth lens element having a negative refractive power. In the image pickup lens, the following conditional expressions are satisfied, $$0.6 < |f2/f| < 1.8$$

$$0 \leq f2/R4 < 1.7$$

where f denotes a focal length of an entire lens system, f2 denotes a focal length of the second lens element, and R4 denotes a curvature radius of an object-side surface of the second lens element.

Since the aperture stop is disposed between the first lens element and the second lens element, the manufacturing sensitivity of the image pickup lens is reduced, leading to an improvement in optical performance. Accordingly, the total optical length can be reduced, realizing size reduction.

In addition, in the image pickup lens satisfying the above conditional expressions, aberrations occurring with increase in the number of pixels included in an image pickup device can be corrected well, and therefore optical performance can be improved.

In the image pickup lens according to the embodiment, it is preferable that the following conditional expression be satisfied, $$0 < f12/f34 < 0.9$$

where f12 denotes a combined focal length of the first and second lens elements, and f34 denotes a combined focal length of the third and fourth lens elements.

By configuring the image pickup lens so as to satisfy the above conditional expression, the combined focal length of the first and second lens elements can be optimized.

In the image pickup lens according to the embodiment, it is preferable that the first lens element have at least one surface thereof being aspherical, the second lens element have at least one surface thereof being aspherical, the third lens element have both surfaces thereof being aspherical, and the fourth lens element have both surfaces thereof being aspherical.

By providing the first to fourth lens elements in such shapes, aberration correctability can be improved.

In the image pickup lens according to the embodiment, it is preferable that the fourth lens element have an inflection point on at least one surface thereof.

By providing the fourth lens element with an inflection point, aberration correctability of the fourth lens element can be improved.

According to another embodiment of the present invention, an image pickup apparatus includes an image pickup lens and an image pickup device configured to convert an optical image formed by the image pickup lens into an electrical signal. The image pickup lens includes, in order from an object side, a first lens element having a positive refractive power and a convex surface facing the object side, an aperture stop adjusting the amount of light, a second lens element having a negative refractive power, a third lens element having a positive refractive power and a concave surface facing the object side, and a fourth lens element having a negative refractive power. In the image pickup apparatus, the following conditional expressions are satisfied, $$0.6 < |f2/f| < 1.8$$

$$0 \leq f2/R4 < 1.7$$

where f denotes a focal length of an entire lens system, f2 denotes a focal length of the second lens element, and R4 denotes a curvature radius of an object-side surface of the second lens element.

Since the aperture stop is disposed between the first lens element and the second lens element, the manufacturing sensitivity of the image pickup lens is reduced, leading to an improvement in optical performance. Accordingly, the total optical length can be reduced, realizing size reduction of the image pickup apparatus.

In addition, in the image pickup apparatus satisfying the above conditional expressions, aberrations occurring with increase in the number of pixels included in the image pickup device can be corrected well, and therefore optical performance can be improved.

BRIEF DESCRIPTION OF THE DRAWINGS

FIG. 9 is a block diagram of the mobile phone.

DESCRIPTION OF THE PREFERRED EMBODIMENTS

Figure 1:
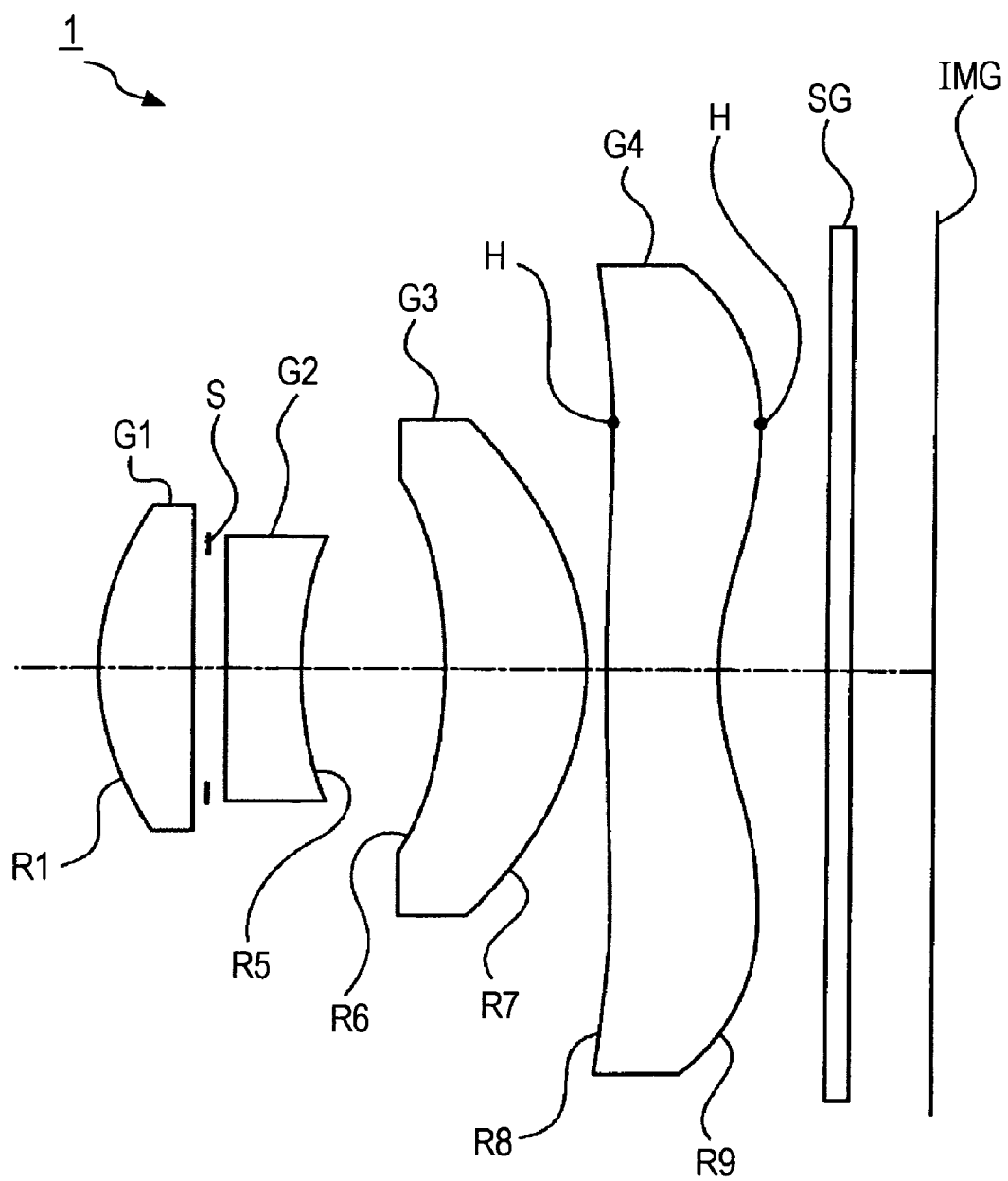
FIG. 1 shows, together with FIGS. 2 to 9, a general embodiment of the image pickup lens and the image pickup apparatus according to the present invention, specifically the configuration of an image pickup lens according to a first exemplary embodiment of the present invention.

Embodiments of the image pickup lens and the image pickup apparatus according to the present invention will now be described.

A general embodiment of the image pickup lens according to the present invention will first be described.

An image pickup lens according to the general embodiment includes, in order from an object side, a first lens element having a positive refractive power and a convex surface facing the object side, an aperture stop adjusting the amount of light, a second lens element having a negative refractive power, a third lens element having a positive refractive power and a concave surface facing the object side, and a fourth lens element having a negative refractive power.

As described above, in the image pickup lens according to the general embodiment, the aperture stop is disposed between the first lens element and the second lens element. Therefore, changes in aberrations due to axial misalignment between the lens elements are smaller than in a case where the aperture stop is disposed on the object side with respect to the first lens. This reduces manufacturing sensitivity, leading to an improvement in optical performance.

In addition, since the aperture stop is positioned between the first lens element and the second lens element, i.e., near the front end of the optical system, an exit pupil is also provided near the front end of the optical system. This reduces the total optical length, that is, the size of the image pickup lens can be reduced.

The image pickup lens according to the general embodiment satisfies the following conditional expressions:

$$0.6 < |f2/f| < 1.8 \tag{1}$$

$$0 \leq f2/R4 < 1.7 \tag{2}$$

where f denotes the focal length of the entire lens system, f2 denotes the focal length of the second lens element, and R4 denotes the curvature radius of the object-side surface of the second lens element.

Conditional Expression (1) defines the ratio of the focal length f2 of the second lens element to the focal length f of the entire lens system, limiting the refractive power of the second lens element. If the range defined by Conditional Expression (1) is violated, it becomes difficult to correct oblique aberrations such as coma and field curvature.

Conditional Expression (2) defines the ratio of the focal length f2 of the second lens element to the curvature radius R4 of the object-side surface of the second lens element, limiting the curvature radius of the object-side surface of the second lens element and the refractive power of the second lens element.

A major function of the second lens element is to correct aberrations occurring in the first lens element. If the range defined by Conditional Expression (2) is violated, the refractive power of the second lens element becomes too large and therefore it is difficult to correct aberrations occurring in the first lens element. If aberration correction by the second lens element is difficult, the second lens element causes large oblique aberrations, such as coma, astigmatism, and field curvature. Such large aberrations are to be corrected by the third lens element. This problematically makes the refractive power of the third lens element too large.

Therefore, with the image pickup lens satisfying Conditional Expressions (1) and (2), aberrations occurring with increase in the number of pixels included in an image pickup device can be corrected well, leading to an improvement in optical performance.

The second lens element, having a negative refractive power, is configured as a biconcave or plano-concave lens so as to satisfy Conditional Expression (2). With the second lens element having such a shape, the occurrence of so-called ghosts, in which thin images overlap each other, and so-called flares, in which rays reflected by lens elements and the like are superimposed on a display screen and form incorrect images, can be suppressed effectively by the second lens element.

To suppress the occurrence of ghosts and flares, it is desirable that the image pickup lens according to the general embodiment satisfies the following conditional expression:

$$0.5 < f2/R4 < 1.7 \qquad (2)'$$

In an exemplary embodiment of the present invention, it is preferable that the image pickup lens satisfies the following conditional expression:

$$0 < f12/f34 < 0.9 \qquad (3)$$

where f12 denotes the combined focal length of the first and second lens elements, and f34 denotes the combined focal length of the third and fourth lens elements.

Conditional Expression (3) defines the ratio of the combined focal length of the first and second lens elements to the combined focal length of the third and fourth lens elements.

If the lower limit of Conditional Expression (3) is violated, the combined focal length of the first and second lens elements becomes too small, and therefore the total optical length becomes too large, making it difficult to reduce the size of the entire lens system.

If the upper limit of Conditional Expression (3) is violated, the combined focal length of the first and second lens elements becomes too large. This produces large aberrations, making it difficult to correct such aberrations by using the third and fourth lens elements and increasing manufacturing sensitivity.

Accordingly, with the image pickup lens satisfying Conditional Expression (3), the total optical length can be reduced and the optical performance can be improved. In addition, since the manufacturing sensitivity of the image pickup lens is also reduced, the optical performance can be improved.

In another exemplary embodiment of the present invention, it is preferable that, in the image pickup lens, the first lens element have at least one surface thereof being aspherical, the second lens element have at least one surface thereof being aspherical, the third lens element have both surfaces thereof being aspherical, and the fourth lens element have both surfaces thereof being aspherical.

The first and second lens elements may each have both surfaces thereof being aspherical so as to improve aberration correctability, or may each have one surface thereof being aspherical so as to reduce manufacturing sensitivity.

The third and fourth lens elements have high aberration correctability. Therefore, by making the object-side surfaces and the image-side surfaces of the third and fourth lens elements aspherical, oblique aberrations, such as coma, field curvature, and distortion, can be corrected effectively.

In another exemplary embodiment of the present invention, it is preferable that, in the image pickup lens, the fourth lens element has an inflection point on at least one surface thereof.

The fourth lens element has high aberration correctability. Therefore, by providing an inflection point on at least one surface of the fourth lens element, aberrations can be corrected effectively. In particular, astigmatism and distortion can be corrected well.

As the size of the image pickup lens becomes smaller, increments with which the incident angles of rays striking the image pickup device increase from the center toward the periphery of the image pickup device become larger. This reduces the amount of light incident on the periphery of the image pickup device. However, with the fourth lens element having an inflection point on at least one surface thereof, the incident angles of the rays traveling toward the periphery of the image pickup device are corrected, whereby the reduction in the amount of light incident on the periphery of the image pickup device can be suppressed.

Next, exemplary embodiments of the image pickup lens according to the present invention and numerical examples provided by applying specific values to the respective exemplary embodiments will be described with reference to the accompanying drawings and tables.

Reference characters used in the description hereinafter denote as follows.

"Si" denotes the surface number of the i-th surface counted from the object side to the image side, "Ri" denotes the curvature radius of the i-th surface, "Di" denotes the axial surface distance between the i-th surface and the (i+1)-th surface, "Ni" denotes the refractive index of the material composing the i-th lens element (Gi) with respect to d-line (having a wavelength of 587.6 nm), and "vi" denotes the Abbe number of the material composing the i-th lens element (Gi) with respect to d-line. "ASP" added a surface number indicates that the surface of interest is aspherical, and "∞" added to a curvature radius indicates that the surface of interest is flat.

Some of lens elements used in the numerical examples have aspherical surfaces.

For each of the aspherical surfaces, when the depth is denoted by Z; the height from the optical axis is denoted by Y; the curvature radius is denoted by R; the conic constant is denoted by K; and the aspherical coefficients of the fourth, sixth, eighth, and tenth orders are denoted by A, B, C, and D, respectively, the aspherical shape is defined as follows:

$$Z = \frac{Y^2/R}{1 + \sqrt{1-(1+K)(Y/R)^2}} + AY^4 + BY^6 + CY^8 + DY^{10}$$

FIG. 1 shows the configuration of an image pickup lens 1 according to a first exemplary embodiment of the present invention.

As can be seen from FIG. 1, the image pickup lens 1 of the first exemplary embodiment includes four lens elements.

The image pickup lens 1 includes, in order from the object side, a first lens element G1 having a positive refractive power and a convex surface facing the object side, a second lens element G2 having a negative refractive power, a third lens element G3 having a positive refractive power and a concave surface facing the object side, and a fourth lens element G4 having a negative refractive power.

The fourth lens element G4 has on both surfaces thereof inflection points H, respectively.

An aperture stop S (a stop surface R3) is disposed between the first lens element G1 and the second lens element G2.

A seal glass SG is disposed between the fourth lens element G4 and an image plane IMG.

Table 1 below summarizes lens data of Numerical Example 1 provided by applying specific values to the image pickup lens 1 according to the first exemplary embodiment, together with the F-number FNo., the focal length f of the entire lens system, and the angle of view 2ω.

TABLE 1

FNo. = 2.8
f = 4.60
2ω = 63.8°

| Si (Surface number) | Ri (Curvature radius) | Di (Surface distance) | Ni (Refractive index) | vi (Abbe number) |
|---|---|---|---|---|
| 1 (ASP) | 1.803 | 0.60 | 1.619 | 63.9 |
| 2 | 26.161 | 0.10 | Air | Air |
| 3 (Stop) | ∞ | 0.10 | Air | Air |
| 4 | −100.000 | 0.50 | 1.589 | 29.9 |
| 5 (ASP) | 3.260 | 0.92 | Air | Air |
| 6 (ASP) | −3.272 | 0.90 | 1.523 | 53.0 |
| 7 (ASP) | −1.428 | 0.18 | Air | Air |
| 8 (ASP) | 5.359 | 0.66 | 1.523 | 53.0 |
| 9 (ASP) | 1.462 | 0.70 | Air | Air |
| 10 | ∞ | 0.15 | 1.519 | 64.3 |
| 11 | ∞ | 0.50 | Air | Air |

In the image pickup lens 1, the object-side surface (R1) of the first lens element G1, the image-side surface (R5) of the second lens element G2, the object-side surface (R6) of the third lens element G3, the image-side surface (R7) of the third lens element G3, the object-side surface (R8) of the fourth lens element G4, and the image-side surface (R9) of the fourth lens element G4 are aspherical. The fourth-, sixth-, eighth-, and tenth-order aspherical coefficients A, B, C, and D, and the conic constant K of each of the aspherical surfaces in Numerical Example 1 are shown in Table 2.

In Tables 2, 4, and 6 provided separately below, showing the aspherical coefficients and the like, "E−i" is an exponential expression with a radix number of 10, i.e., "$10^{-i}$". For example, "0.12345E−05" represents "$0.12345 \times 10^{-5}$".

TABLE 2

| Conic constant & aspherical coefficient | Surface number | | | | | |
|---|---|---|---|---|---|---|
| | 1st surface | 5th surface | 6th surface | 7th surface | 8th surface | 9th surface |
| K | −0.305 | 1.761 | 0.000 | −1.501 | −761.130 | −9.320 |
| A | 4.872E−03 | 3.310E−02 | 2.688E−03 | 6.193E−02 | −5.419E−02 | −4.329E−02 |
| B | 9.609E−03 | −4.431E−03 | −2.161E−02 | −2.834E−02 | 2.259E−02 | 6.967E−03 |
| C | −8.901E−03 | 1.822E−02 | −3.724E−03 | 4.912E−03 | −3.971E−03 | −6.864E−04 |
| D | 3.851E−03 | −1.150E−03 | 5.553E−04 | 0.000E+00 | 2.509E−04 | 4.601E−06 |

Figure 2:
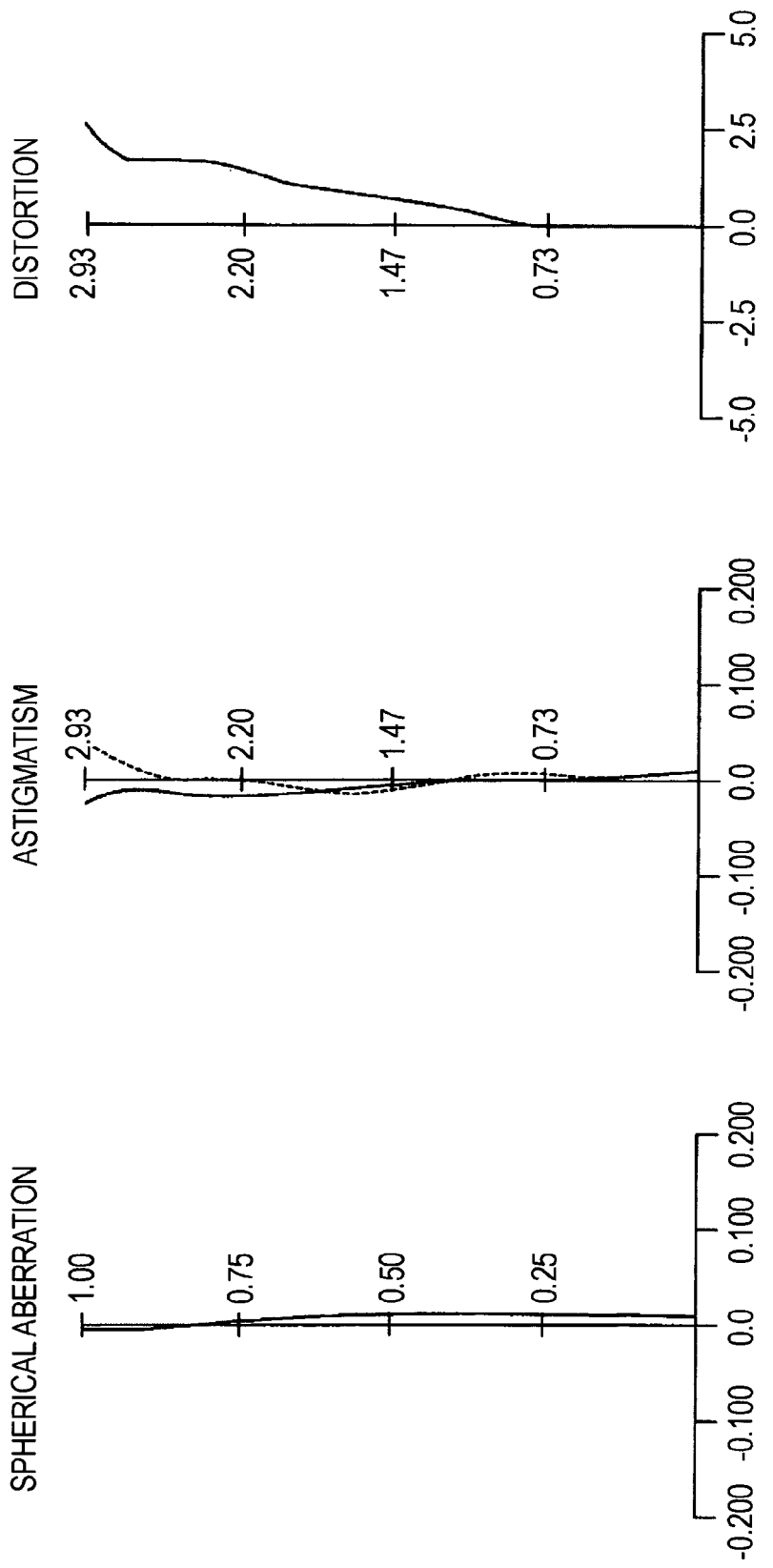
FIG. 2 includes diagrams showing spherical aberration, astigmatism, and distortion in a numerical example provided by applying specific values to the first exemplary embodiment.

FIG. 2 shows diagrams of aberrations occurring in Numerical Example 1.

In the diagram of astigmatism shown in FIG. 2, the solid line represents values in the sagittal image plane, and the dashed line represents values in the meridional image plane.

As is apparent from the diagrams in FIG. 2, Numerical Example 1 exhibits good correctability for various aberrations and excellent imaging performance.

Figure 3:
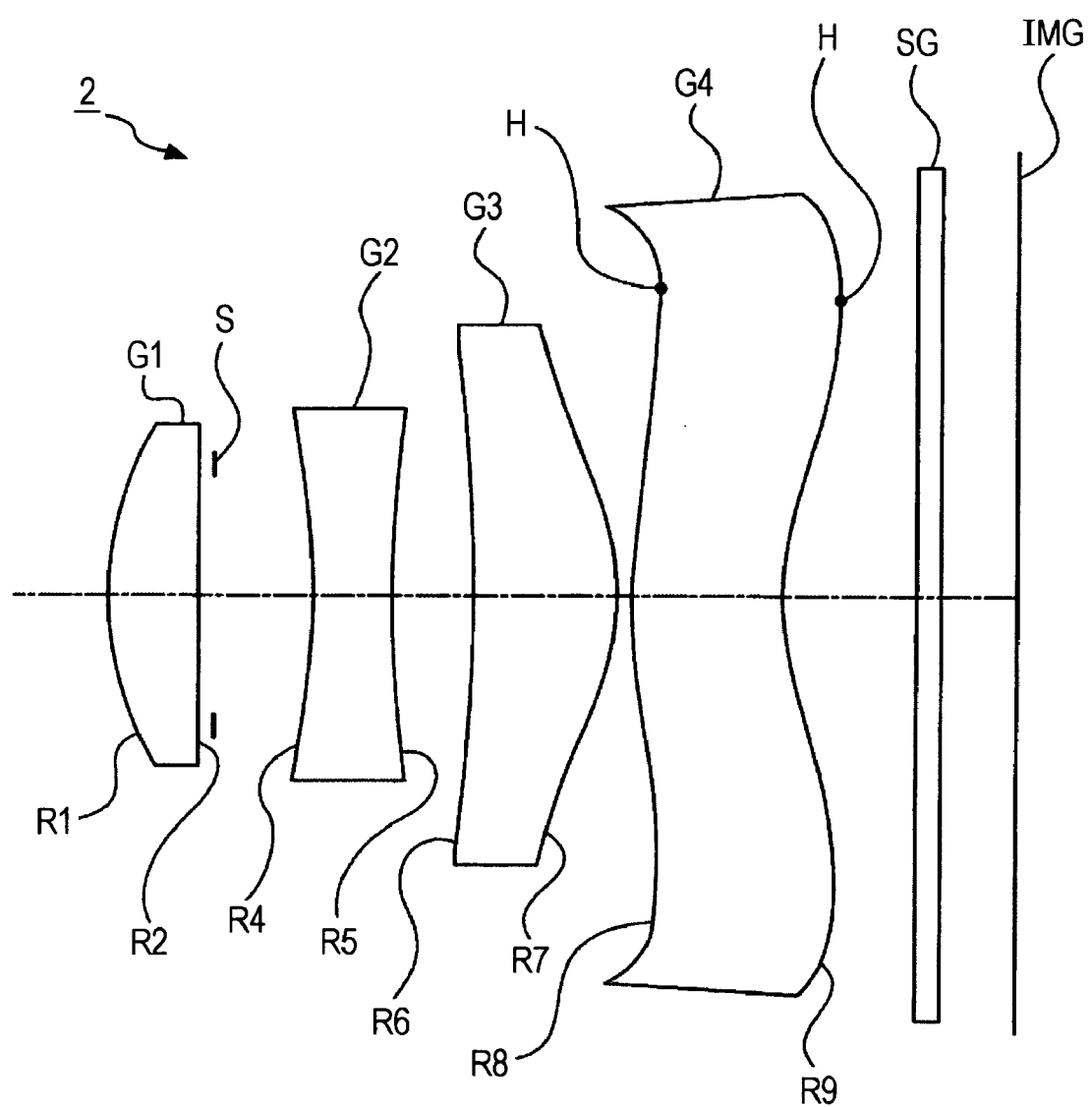
FIG. 3 shows the configuration of an image pickup lens according to a second exemplary embodiment of the present invention.

FIG. 3 shows the configuration of an image pickup lens 2 according to a second exemplary embodiment of the present invention.

As can be seen from FIG. 3, the image pickup lens 2 of the second exemplary embodiment includes four lens elements.

The image pickup lens 2 includes, in order from the object side, a first lens element G1 having a positive refractive power and a convex surface facing the object side, a second lens element G2 having a negative refractive power, a third lens element G3 having a positive refractive power and a concave surface facing the object side, and a fourth lens element G4 having a negative refractive power.

The fourth lens element G4 has on both surfaces thereof inflection points H, respectively.

An aperture stop S (a stop surface R3) is disposed between the first lens element G1 and the second lens element G2.

A seal glass SG is disposed between the fourth lens element G4 and an image plane IMG.

Table 3 below summarizes lens data of Numerical Example 2 provided by applying specific values to the image pickup lens 2 according to the second exemplary embodiment, together with the F-number FNo., the focal length f of the entire lens system, and the angle of view 2ω.

TABLE 3

FNo. = 2.8
f = 4.60
2ω = 62.6°

| Si (Surface number) | Ri (Curvature radius) | Di (Surface distance) | Ni (Refractive index) | vi (Abbe number) |
|---|---|---|---|---|
| 1 (ASP) | 1.973 | 0.60 | 1.530 | 55.8 |
| 2 (ASP) | 86.536 | 0.10 | Air | Air |
| 3 (Stop) | ∞ | 0.40 | Air | Air |
| 4 (ASP) | −3.500 | 0.74 | 1.589 | 29.9 |
| 5 (ASP) | 48.388 | 0.69 | Air | Air |
| 6 (ASP) | −3.911 | 0.90 | 1.530 | 55.8 |
| 7 (ASP) | −1.355 | 0.11 | Air | Air |
| 8 (ASP) | 3.469 | 0.87 | 1.530 | 55.8 |
| 9 (ASP) | 1.180 | 0.91 | Air | Air |
| 10 | ∞ | 0.15 | 1.519 | 64.3 |
| 11 | ∞ | 0.50 | Air | Air |

In the image pickup lens 2, the object-side surface (R1) of the first lens element G1, the image-side surface (R2) of the first lens element G1, the object-side surface (R4) of the second lens element G2, the image-side surface (R5) of the second lens element G2, the object-side surface (R6) of the third lens element G3, the image-side surface (R7) of the third lens element G3, the object-side surface (R8) of the fourth lens element G4, and the image-side surface (R9) of the fourth lens element G4 are aspherical. The fourth-, sixth-, eighth-, and tenth-order aspherical coefficients A, B, C, and D, and the conic constant K of each of the aspherical surfaces in Numerical Example 2 are shown in Table 4.

TABLE 4

| Conic constant & aspherical coefficient | Surface number | | | |
|---|---|---|---|---|
| | 1st surface | 2nd surface | 4th surface | 5th surface |
| K | 0.760 | 0.000 | −2.428 | 0.000 |
| A | 4.916E−04 | 1.788E−02 | 3.180E−03 | 6.066E−02 |
| B | −1.542E−03 | −1.381E−02 | −4.535E−02 | −4.762E−02 |
| C | 6.024E−03 | 0.000E+00 | 0.000E+00 | 1.373E−02 |
| D | −7.617E−03 | 0.000E+00 | 0.000E+00 | −1.359E−04 |

TABLE 4-continued

| Conic constant & aspherical coefficient | Surface number | | | |
|---|---|---|---|---|
| | 6th surface | 7th surface | 8th surface | 9th surface |
| K | 0.000 | −1.459 | −37.320 | −5.803 |
| A | 9.388E−02 | 8.401E−02 | −1.693E−03 | −1.983E−02 |
| B | −2.561E−02 | −1.811E−02 | −9.696E−03 | 5.927E−04 |
| C | 5.804E−04 | 2.726E−03 | 2.909E−03 | 8.040E−05 |
| D | 5.553E−04 | 0.000E+00 | −2.551E−04 | −1.873E−05 |

Figure 4:
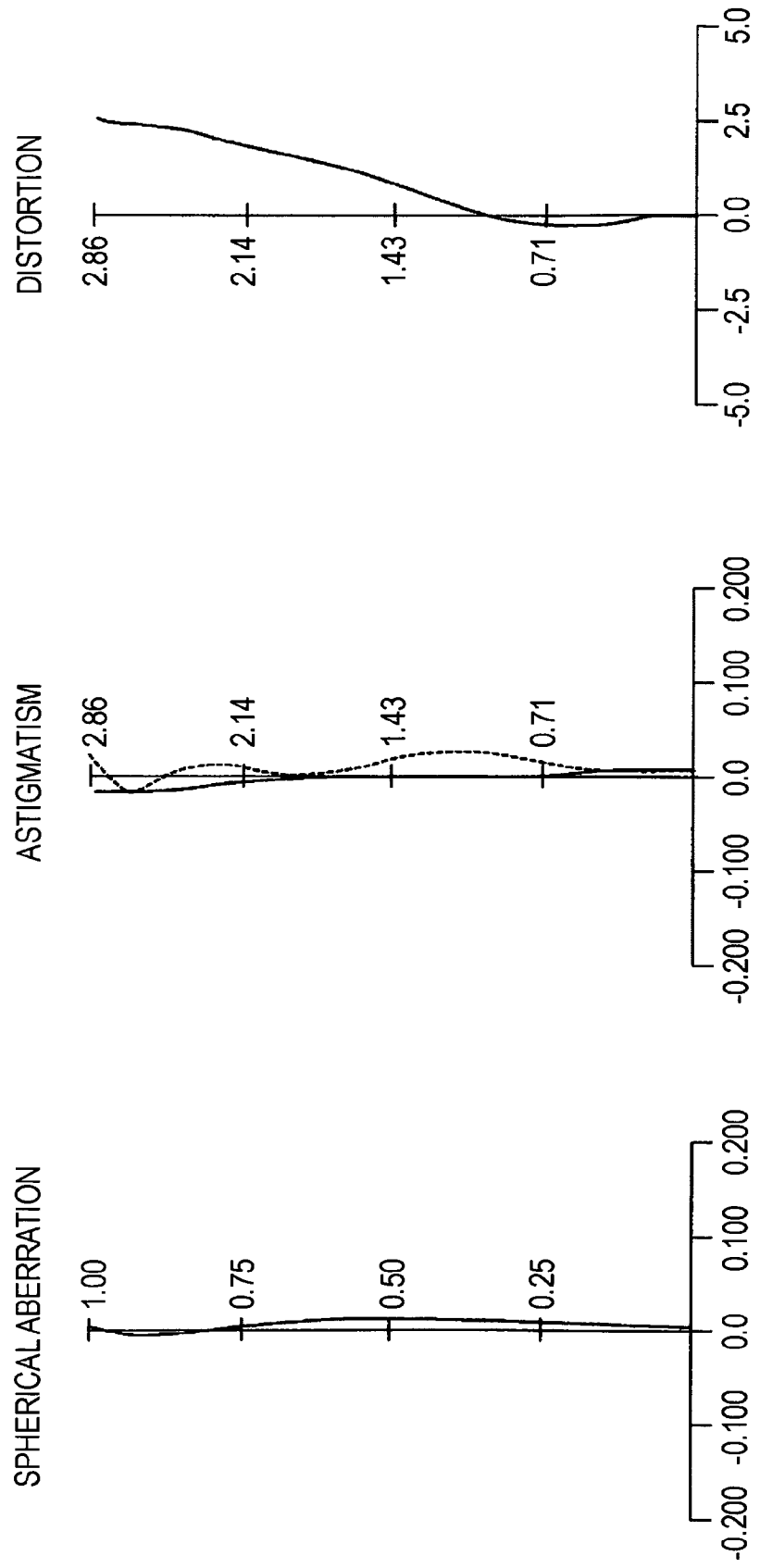
FIG. 4 includes diagrams showing spherical aberration, astigmatism, and distortion in a numerical example provided by applying specific values to the second exemplary embodiment.

FIG. 4 shows diagrams of aberrations occurring in Numerical Example 2.

In the diagram of astigmatism shown in FIG. 4, the solid line represents values in the sagittal image plane, and the dashed line represents values in the meridional image plane.

As is apparent from the diagrams in FIG. 4, Numerical Example 2 exhibits good correctability for various aberrations and excellent imaging performance.

Figure 5:
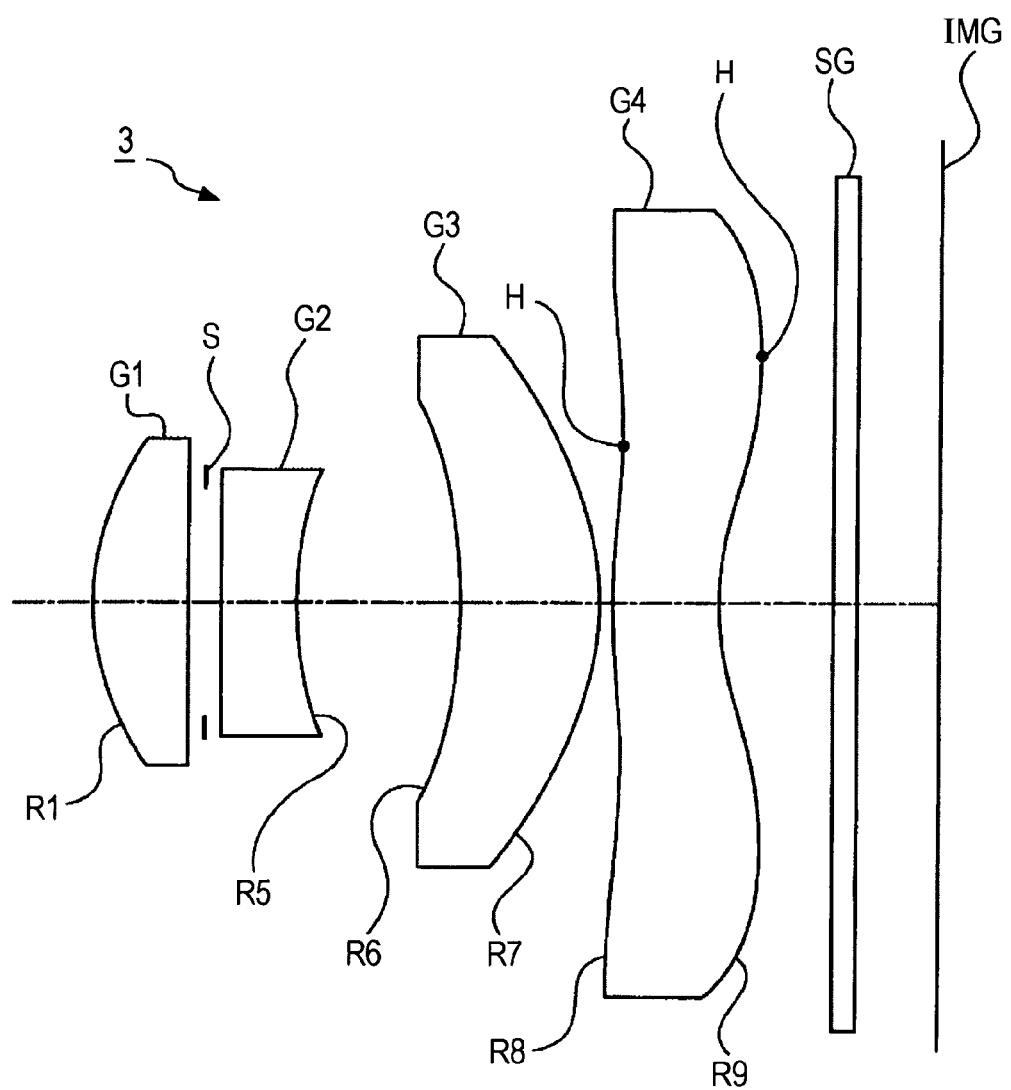
FIG. 5 shows the configuration of an image pickup lens according to a third exemplary embodiment of the present invention.

FIG. 5 shows the configuration of an image pickup lens 3 according to a third exemplary embodiment of the present invention.

As can be seen from FIG. 5, the image pickup lens 3 of the third exemplary embodiment includes four lens elements.

The image pickup lens 3 includes, in order from the object side, a first lens element G1 having a positive refractive power and a convex surface facing the object side, a second lens element G2 having a negative refractive power, a third lens element G3 having a positive refractive power and a concave surface facing the object side, and a fourth lens element G4 having a negative refractive power.

The fourth lens element G4 has on both surfaces thereof inflection points H, respectively.

An aperture stop S (a stop surface R3) is disposed between the first lens element G1 and the second lens element G2.

A seal glass SG is disposed between the fourth lens element G4 and an image plane IMG.

Table 5 below summarizes lens data of Numerical Example 3 provided by applying specific values to the image pickup lens 3 according to the third exemplary embodiment, together with the F-number FNo., the focal length f of the entire lens system, and the angle of view 2ω.

TABLE 5

FNo. = 2.8
f = 4.60
2ω = 62.9°

| Si (Surface number) | Ri (Curvature radius) | Di (Surface distance) | Ni (Refractive index) | νi (Abbe number) |
|---|---|---|---|---|
| 1 (ASP) | 1.786 | 0.60 | 1.583 | 59.4 |
| 2 | 144.886 | 0.10 | Air | Air |
| 3 (Stop) | ∞ | 0.10 | Air | Air |
| 4 | −100.000 | 0.50 | 1.589 | 29.9 |

TABLE 5-continued

FNo. = 2.8
f = 4.60
2ω = 62.9°

| Si (Surface number) | Ri (Curvature radius) | Di (Surface distance) | Ni (Refractive index) | νi (Abbe number) |
|---|---|---|---|---|
| 5 (ASP) | 2.999 | 0.98 | Air | Air |
| 6 (ASP) | −4.991 | 0.90 | 1.530 | 55.8 |
| 7 (ASP) | −1.643 | 0.10 | Air | Air |
| 8 (ASP) | 3.546 | 0.65 | 1.530 | 55.8 |
| 9 (ASP) | 1.283 | 0.72 | Air | Air |
| 10 | ∞ | 0.15 | 1.519 | 64.3 |
| 11 | ∞ | 0.50 | Air | Air |

In the image pickup lens 3, the object-side surface (R1) of the first lens element G1, the image-side surface (R5) of the second lens element G2, the object-side surface (R6) of the third lens element G3, the image-side surface (R7) of the third lens element G3, the object-side surface (R8) of the fourth lens element G4, and the image-side surface (R9) of the fourth lens element G4 are aspherical. The fourth-, sixth-, eighth-, and tenth-order aspherical coefficients A, B, C, and D, and the conic constant K of each of the aspherical surfaces in Numerical Example 3 are shown in Table 6.

TABLE 6

| Conic constant & aspherical coefficient | Surface number | | | | | |
|---|---|---|---|---|---|---|
| | 1st surface | 5th surface | 6th surface | 7th surface | 8th surface | 9th surface |
| K | −0.3333 | 1.018 | 0.000 | −1.111 | −44.907 | −6.812 |
| A | 7.381E−03 | 2.969E−02 | 2.862E−02 | 6.348E−02 | −6.466E−02 | −4.324E−02 |
| B | 5.500E−03 | 1.226E−02 | −3.892E−02 | −2.320E−02 | 2.447E−02 | 7.817E−03 |
| C | −3.316E−03 | 4.661E−03 | 5.100E−03 | 3.306E−03 | −3.903E−03 | −9.520E−04 |
| D | 1.397E−03 | 4.232E−03 | 5.553E−04 | 0.000E+00 | 2.297E−04 | 3.776E−05 |

Figure 6:
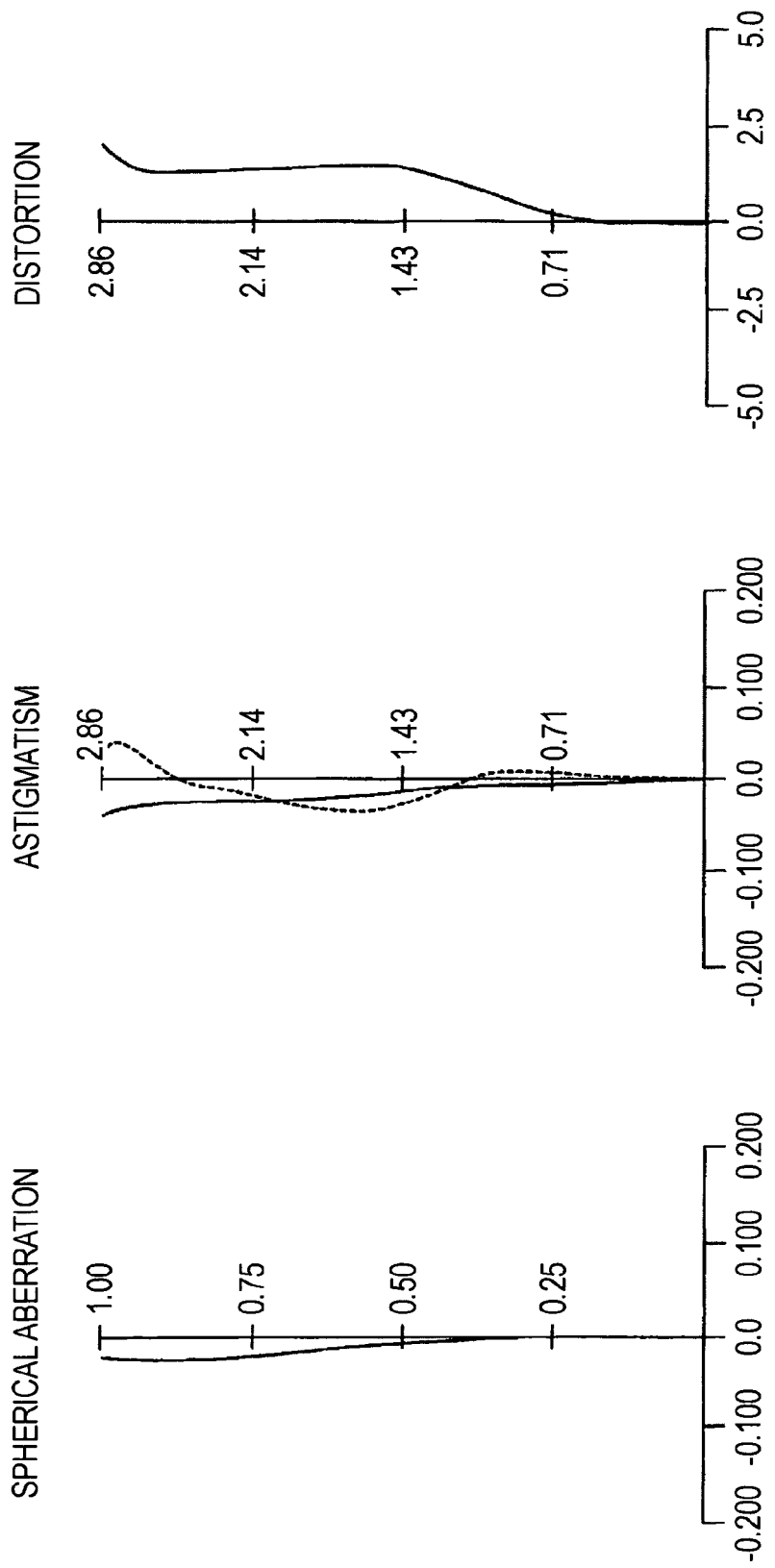
FIG. 6 includes diagrams showing spherical aberration, astigmatism, and distortion in a numerical example provided by applying specific values to the third exemplary embodiment.

FIG. 6 shows diagrams of aberrations occurring in Numerical Example 3.

In the diagram of astigmatism shown in FIG. 6, the solid line represents values in the sagittal image plane, and the dashed line represents values in the meridional image plane.

As is apparent from the diagrams in FIG. 6, Numerical Example 3 exhibits good correctability for various aberrations and excellent imaging performance.

Table 7 summarizes values of Conditional Expressions (1) to (3), i.e., values of f, f2, and |f2/f| in Conditional Expression (1), values of f2, R4, and f2/R4 in Conditional Expression (2), and values of f12, f34, and f12/f34 in Conditional Expression (3), in each of the image pickup lenses 1, 2, and 3.

TABLE 7

| | | Image pickup lens 1 | Image pickup lens 2 | Image pickup lens 3 |
|---|---|---|---|---|
| | f | 4.60 | 4.60 | 4.60 |
| | f2 | −5.31 | −5.66 | −4.95 |
| Conditional Expression (1) | 0.6 < |f2/f| < 1.8 | 1.15 | 1.23 | 1.08 |
| | R4 | −100 | −3.5 | −100 |
| Conditional Expression (2) | 0 ≦ f2/R4 < 1.7 | 0.05 | 1.62 | 0.05 |
| | f12 | 5.26 | 6.66 | 5.54 |
| | f34 | 47.50 | 12.13 | 31.59 |
| Conditional Expression (3) | 0 < f12/f34 < 0.9 | 0.11 | 0.55 | 0.18 |

Although the image pickup lenses 1 to 3 according to the respective exemplary embodiments each include the fourth lens element G4 having inflection points H on both surfaces thereof, the forth lens element G4 is not limited thereto, and may alternatively be provided with an inflection point H only on one of the surfaces thereof.

Next, a general embodiment of the image pickup apparatus according to the present invention will be described.

An image pickup apparatus according to the general embodiment of the present invention includes an image pickup lens and an image pickup device configured to convert an optical image formed by the image pickup lens into an electrical signal.

The image pickup lens included in the image pickup apparatus includes, in order from the object side, a first lens element having a positive refractive power and a convex surface facing the object side, an aperture stop adjusting the amount of light, a second lens element having a negative refractive power, a third lens element having a positive refractive power and a concave surface facing the object side, and a fourth lens element having a negative refractive power.

As described above, in the image pickup lens of the image pickup apparatus according to the general embodiment, the aperture stop is disposed between the first lens element and the second lens element. Therefore, changes in aberrations due to axial misalignment between the lens elements are smaller than in a case where the aperture stop is disposed on the object side with respect to the first lens. This reduces manufacturing sensitivity, leading to an improvement in optical performance.

In addition, since the aperture stop is positioned between the first lens element and the second lens element, i.e., near the front end of the optical system, an exit pupil is also provided near the front end of the optical system. This reduces the total optical length, that is, the size of the image pickup apparatus can be reduced.

The image pickup apparatus according to the general embodiment is configured such that the image pickup lens included therein satisfies the following conditional expressions:

$$0.6 < |f2/f| < 1.8 \quad (1)$$

$$0 \leq f2/R4 < 1.7 \quad (2)$$

where f denotes the focal length of the entire lens system, f2 denotes the focal length of the second lens element, and R4 denotes the curvature radius of the object-side surface of the second lens element.

Conditional Expression (1) defines the ratio of the focal length f2 of the second lens element to the focal length f of the entire lens system, limiting the refractive power of the second lens element. If the range defined by Conditional Expression (1) is violated, it becomes difficult to correct oblique aberrations such as coma and field curvature.

Conditional Expression (2) defines the ratio of the focal length f2 of the second lens element to the curvature radius R4 of the object-side surface of the second lens element, limiting the curvature radius of the object-side surface of the second lens element and the refractive power of the second lens element.

A major function of the second lens element is to correct aberrations occurring in the first lens element. If the range defined by Conditional Expression (2) is violated, the refractive power of the second lens element becomes too large and therefore it is difficult to correct aberrations occurring in the first lens element. If aberration correction by the second lens element is difficult, the second lens element causes large oblique aberrations, such as coma, astigmatism, and field curvature. Such large aberrations are to be corrected by the third lens element. This problematically makes the refractive power of the third lens element too large.

Therefore, with the image pickup lens satisfying Conditional Expressions (1) and (2), aberrations occurring with increase in the number of pixels included in the image pickup device can be corrected well, leading to an improvement in optical performance.

The second lens element, having a negative refractive power, is configured as a biconcave or plano-concave lens so as to satisfy Conditional Expression (2). With the second lens element having such a shape, the occurrence of so-called ghosts, in which thin images overlap each other, and so-called flares, in which rays reflected by lens elements and the like are superimposed on a display screen and form incorrect images, can be suppressed effectively by the second lens element.

To suppress the occurrence of ghosts and flares, it is desirable that the image pickup lens of the image pickup apparatus according to the general embodiment satisfy the following conditional expression:

$$0.5 < f2/R4 < 1.7 \quad (2)'$$

Next, an exemplary embodiment in which the image pickup apparatus according to the foregoing general embodiment of the present invention is applied to a mobile phone will be described with reference to FIGS. 7 to 9.

Figure 7:
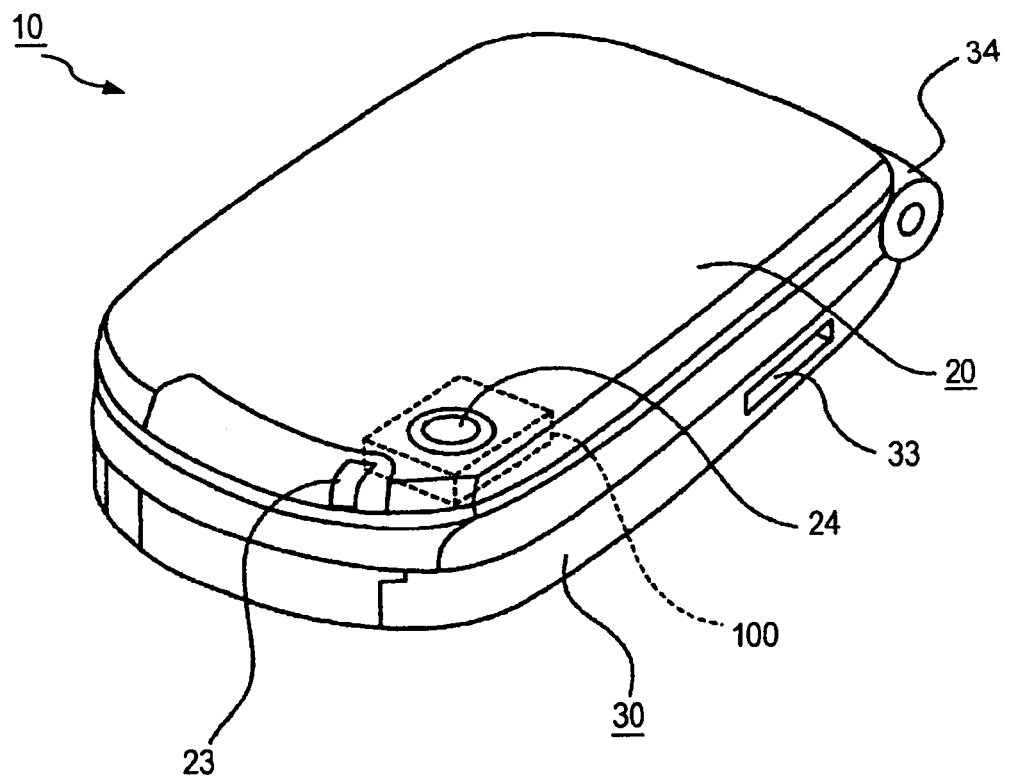
FIG. 7 shows, together with FIGS. 8 and 9, a perspective view of an exemplary mobile phone to which an image pickup apparatus according to a general embodiment of the present invention is applied, in a state where the mobile phone is in a folded state.
Figure 8:
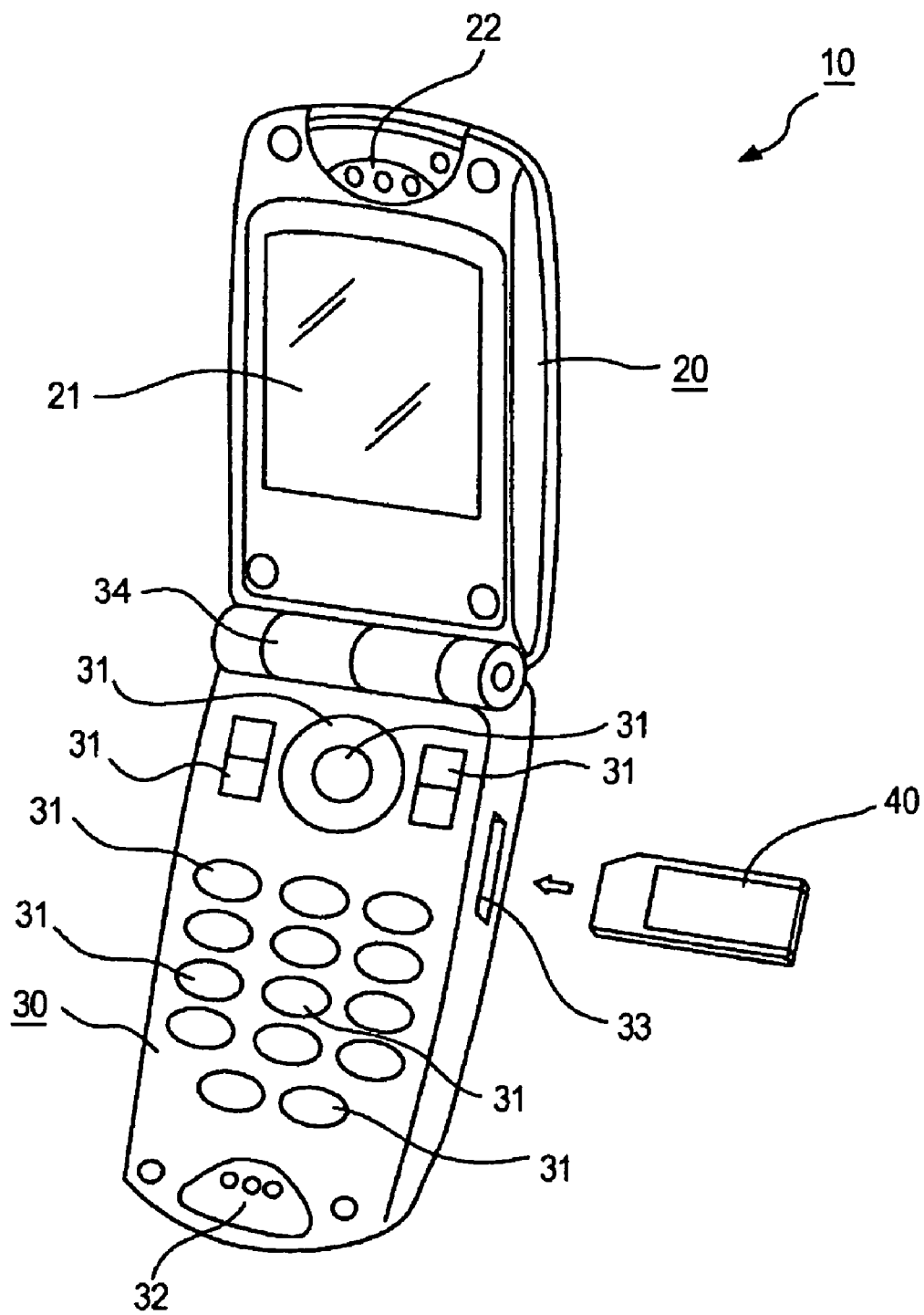
FIG. 8 is a perspective view of the mobile phone in an open state.

Referring to FIGS. 7 and 8, a mobile phone 10 includes a display unit 20, a body 30, and a hinge 34 coupling the display unit 20 and the body 30 so as to be foldable together. When the mobile phone 10 is carried, the display unit 20 and the body 30 are folded together, as shown in FIG. 7. When the mobile phone 10 is used for making a call, the display unit 20 and the body 30 are opened, as shown in FIG. 8.

The display unit 20 has on one surface thereof a liquid crystal display panel 21 and a speaker 22 provided at an upper portion with respect to the liquid crystal display panel 21. The display unit 20 also has an image pickup unit 100 inside. The image pickup unit 100 includes any of the image pickup lenses 1 to 3. The display unit 20 also has an infrared communication unit 23 configured to perform infrared communication.

The display unit 20 has on the other surface thereof a cover lens 24 provided on the object side with respect to the first lens element G1 included in the image pickup unit 100.

The body 30 has on one surface thereof various operation keys 31, such as numerical keys and a power key, and a microphone 32. The body 30 has on one side surface thereof a memory card slot 33, into and through which a memory card 40 is inserted and removed.

FIG. 9 is a block diagram showing the configuration of the mobile phone 10.

The mobile phone 10 includes a central processing unit (CPU) 50. The CPU 50 controls the entire operation of the mobile phone 10. For example, the CPU 50 extracts a control program stored in a read-only memory (ROM) 51 into a random access memory (RAM) 52 and controls the operation of the mobile phone 10 via a bus 53.

A camera control unit 60 controls the image pickup unit 100 so that a still image and a moving image are shot. The camera control unit 60 compresses information on an image that has been shot into a Joint-Photographic-Experts-Group (JPEG) format or a Moving-Picture-Experts-Group (MPEG) format, for example, and sends the compressed data to the bus 53. The image pickup unit 100 includes, in addition to any of the image pickup lenses 1 to 3, an image pickup device 101, such as a CCD or a CMOS.

The image information sent to the bus 53 is temporarily stored in the RAM 52 and is appropriately output to a memory card interface 41 so that the information is stored in the memory card 40 or to a display control unit 54 so that the image information is displayed on the liquid crystal display panel 21. Audio information recorded through the microphone 32, together with the image information, during the shooting operation is also temporarily stored in the RAM 52 or the memory card 40 via an audio codec 70. Then, simultaneously with image display on the liquid crystal display panel 21, the audio information is output from the audio codec 70 to the outside through the speaker 22.

Image information and audio information are appropriately output to an infrared communication interface 55 and is sent therefrom via the infrared communication unit 23 to an external apparatus having an infrared communication unit, such as a mobile phone, a personal computer, or a personal digital assistant (PDA). When a moving image or a still image is displayed on the liquid crystal display panel 21 in accordance with the image information stored in the RAM 52 or the memory card 40, a file stored in the RAM 52 or the memory card 40 is decoded or decompressed by the camera control unit 60, and image data obtained by the decoding or decompression is sent via the bus 53 to the display control unit 54.

A communication control unit 80 sends and receives radio waves to and from a base station via an antenna (not shown) provided inside the display unit 20. In an audio communication mode, the communication control unit 80 processes audio information that has been received and outputs the information via the audio codec 70 to the speaker 22, or receives via the audio codec 70 audio information collected through the microphone 32, processes the information in a predetermined manner, and sends the information.

With any of the image pickup lenses 1 to 3, the total optical length can be reduced, as described above, and therefore can be employed easily in an image pickup apparatus, such as the mobile phone 10, desired to have a thin body.

Although the foregoing exemplary embodiment concerns a case where the image pickup apparatus is applied to a mobile phone, the image pickup apparatus is not limited thereto and may be widely applied to any of other various digital input/output apparatuses, such as a digital video camera, a digital still camera, a personal computer equipped with a camera, and a PDA equipped with a camera.

The shapes and values of relevant elements given in the embodiments described above are only exemplary and do not limit the technical scope of the present invention.

The present application contains subject matter related to that disclosed in Japanese Priority Patent Application JP 2008-112607 filed in the Japan Patent Office on Apr. 23, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup lens comprising, in order from an object side:
    a first lens element having a positive refractive power and a convex surface facing the object side;
    an aperture stop adjusting the amount of light;
    a second lens element having a negative refractive power;
    a third lens element having a positive refractive power and a concave surface facing the object side; and
    a fourth lens element having a negative refractive power,
    wherein the following conditional expressions are satisfied, $0.6 < |f2/f| < 1.8$ $0 \leq f2/R4 < 1.7$ $0 < f12/f34 < 0.9$ where f denotes a focal length of an entire lens system, f2 denotes a focal length of the second lens element, R4 denotes a curvature radius of an object-side surface of the second lens element, f12 denotes a combined focal length of the first and second lens elements, and f34 denotes a combined focal length of the third and fourth lens elements.

2. The image pickup lens according to claim 1, wherein the first lens element has at least one surface thereof being aspherical, the second lens element has at least one surface thereof being aspherical, the third lens element has both surfaces thereof being aspherical, and the fourth lens element has both surfaces thereof being aspherical.

3. The image pickup lens according to claim 1, wherein the fourth lens element has an inflection point on at least one surface thereof.

4. An image pickup apparatus comprising:
    an image pickup lens; and
    an image pickup device configured to convert an optical image formed by the image pickup lens into an electrical signal,
    wherein the image pickup lens includes, in order from an object side,
    a first lens element having a positive refractive power and a convex surface facing the object side;
    an aperture stop adjusting the amount of light;
    a second lens element having a negative refractive power;
    a third lens element having a positive refractive power and a concave surface facing the object side; and
    a fourth lens element having a negative refractive power,
    wherein the following conditional expressions are satisfied, $0.6 < |f2/f| < 1.8$ $0 \leq f2/R4 < 1.7$ $0 < f12/f34 < 0.9$ where f denotes a focal length of an entire lens system, f2 denotes a focal length of the second lens element, R4 denotes a curvature radius of an object-side surface of the second lens element, f12 denotes a combined focal length of the first and second lens elements, and f34 denotes a combined focal length of the third and fourth lens elements.

5. The image pickup apparatus according to claim 4, wherein the first lens element has at least one surface thereof being aspherical, the second lens element has at least one surface thereof being aspherical, the third lens element has both surfaces thereof being aspherical, and the fourth lens element has both surfaces thereof being aspherical.

6. The image pickup apparatus according to claim 4, wherein the fourth lens element has an inflection point on at least one surface thereof.

* * * * *